United States Patent Office 3,634,377
Patented Jan. 11, 1972

3,634,377
PROCESS FOR PRODUCING POLYMERS OF ETHYLENE
Toshio Hori, Junichi Hotta, Mabuchi Kiyoshi, and Yoshio Nakajima, Yokkaichi-shi, Mie-ken, Japan, assignors to Mitsubishi Petrochemical Co., Ltd., Tokyo, Japan
No Drawing. Filed June 26, 1969, Ser. No. 836,963
Int. Cl. C08f 1/56, 3/06
U.S. Cl. 260—88.2    3 Claims

ABSTRACT OF THE DISCLOSURE

Process for producing polymers of ethylene which comprises bringing a member selected from the group consisting of ethylene and a mixture of ethylene and $\alpha$-olefin into contact with a catalyst composition essentially consisting of (A) alkylalkoxyaluminum chloride represented by the general formula, $AlR(OR')Cl$, wherein R represents an alkyl group having from 1 to 8 carbon atoms and OR' represents an alkoxy group having from 1 to 10 carbon atoms; (B) tetravalent titanium compound represented by the general formula, $Ti(OR'')_nCl_{4-n}$, wherein OR'' represents an alkoxy group having from 1 to 10 carbon atoms and $n$ is an integer of from 0 to 4; and (C) solid titanium compound containing alkoxy group having from 1 to 10 carbon atoms in the proportion of not less than 0.2 to a titanium atom.

BACKGROUND OF THE INVENTION

(1) Field of the invention

This invention relates to a process for polymerizing ethylene, and more particularly, it relates to a process for producing homopolymers of ethylene or copolymers of ethylene and not more than 5% by weight of $\alpha$-olefins such as, e.g., propylene and butene-1, in the presence of a specific catalyst.

(2) Description of the prior art

It is known well heretofore that ethylene may be polymerized in the presence of a ternary catalyst composition consisting of mono-alkylaluminum compound, tetravalent vanadium compound and titanium trihalide.

For example, there have been known a catalyst composition consisting of titanium trihalide, titanium tetrahalide and alkylaluminum dihalide or alkylaluminum dialkoxide as disclosed in Japanese Patent No. 284,311, or that consisting of titanium trichloride, $TiX_4$ and $AlRX_2$ (wherein X is partly halogen or partly alkoxy or aryloxy group) as proposed in Japanese Pat. No. 306,272.

However, when ethylene is polymerized in the presence of the ternary catalyst composition containing alkyl aluminum halide known heretofore referred to above, there is formed a thin film of ethylene polymer on the inner surface of a polymerization reactor and on agitator blades. Thus, polymer produced strongly adheres to the surfaces. As a result, there are caused hindrances which are fatal to the operation of the process, for example, drastic lowering in the agitation efficiency, difficulty in removing the heat of polymerization generated and impossibility in transporting polymer from a polymerization reactor to subsequent equipment.

SUMMARY OF THE INVENTION

It is, therefore, an object of the present invention to provide a novel process for polymerizing ethylene, free from the drawbacks of the prior art processes as mentioned above.

The present inventors have conducted a number of experiments with regard to the prevention of polymers from adhering to the polymerization equipment in the polymerization of ethylene using the ternary catalyst compositions known heretofore.

As a result, it has been found that the formation of thin film and cohesion of polymers in the polymerization equipment may be remarkably improved by the use of monoalkylaluminum containing alkoxy group, e.g. alkylalkoxyaluminum chloride, as a catalyst component, instead of alkylaluminum halides employed in the known ternary catalyst composition.

However, a ternary catalyst composition consisting of monoalkylaluminum containing alkoxy group, tetravalent titanium compound and titanium trihalide has only a low activity in polymerizing ethylene, so that, in fact, substantially no ethylene is polymerized by using such a catalyst composition.

It has been found, however, that if a solid titanium compound containing alkoxy group in the proportion of not less than 0.2 to a titanium atom is substituted for titanium trihalide of the known ternary catalyst composition, quite unexpectedly, there is obtained a novel ternary catalyst composition having a high activity in polymerizing ethylene and causing no cohesion of the resulting polymers to the polymerization equipment.

The process for producing polymers of ethylene according to the present invention has its basis on this discovery, and it comprises bringing ethylene or a mixture of ethylene and not more than 5% by weight of $\alpha$-olefin based on the weight of ethylene into contact with a combination catalyst system essentially consisting of (A) alkylalkoxyaluminum chloride of the general formula, $AlR(OR')Cl$, wherein R represents an alkyl group having from 1 to 8 carbon atoms and OR' represents an alkoxy group having from 1 to 10 carbon atoms, (B) tetravalent titanium compound of the general formula, $Ti(OR'')_nCl_{4-n}$, wherein OR'' represents an alkoxy group having from 1 to 10 carbon atoms and $n$ is an integer of from 0 to 4, and (C) solid titanium compound containing alkoxy group having from 1 to 10 carbon atoms in the proportion of not less than 0.2 to a titanium atom.

The term "polymerization" and "polymer" as referred to herein shall be construed to mean "homo- and co-polymerization" and "homo- and copolymer," respectively.

By the use of the catalyst composition of the present invention, there are brought about advantages in that not only the cohesion of polymers to the polymerization equipment can be eliminated but also the polymerization catalytic activity can be enhanced. Moreover, by the use of the catalyst composition of the present invention, it is possible to produce polymers of ethylene having a narrow molecular weight distribution as compared with the known processes using the conventionally known ternary catalyst composition. Thus, polymers of ethylene obtained according to the present invention have quite excellent characteristics as a material for injection-molded shaped articles.

Alkylalkoxyaluminum chlorides which may be used in the present invention as one of the catalyst component (A) include those having an alkyl group such as, for example, methyl, ethyl, propyl, n- or iso-butyl, n-hexyl or n-octyl group, and having an alkoxy group such as, for example, methoxy, ethoxy, propoxy, n-, iso-, sec- or tert-butoxy, pentoxy, octoxy- or decoxy group. It is known that these alkylalkoxyaluminum chlorides referred to above normally have dimeric or trimeric structure in a hydrocarbon solvent.

With regard to the preparation of these alkylalkoxyaluminum chlorides, there have been known heretofore various processes, for example, a process in which dialkylaluminum chloride is reacted with alcohol as described in Angewandte Chemie, 75 (18), 846–851 (1963); a process involving the reaction of trialkylaluminum, aluminum trichloride and trialkoxyaluminum as disclosed in German patent specification No. 1,070,179; and a process in which alkylaluminum sesquichloride is reacted with trialkoxyaluminum as proposed in Japanese patent publication No. 15,364/61.

Compounds of the general formula $Ti(OR'')_nCl_{4-n}$ which may be used as another component (B) of the catalyst composition of the present invention include compounds having an alkoxy group such as, e.g. methoxy, ethoxy, propoxy, n-, iso-, sec- or tert-butoxy, pentoxy, octoxy or decoxy group and having a value of from 0 to 4 for the $n$ shown in the general formula referred to above. Examples of such compounds as defined above include tetramethoxytitanium, tetraethoxytitanium, tetrapropoxytitanium, tetra-n-, -iso-, -sec- or -tert-butoxytitanium, tetra-n-octoxytitanium, triethoxytitanium chloride, tripropoxytitanium chloride, tri-n-, -iso-, -sec- or -tert-butoxytitanium chloride, diethoxytitanium chloride, dipropoxytitanium chloride, di-n-, -iso-, -sec- or -tert-butoxytitanium dichloride, ethoxytitanium trichloride, propoxytitanium trichloride, n-, iso-, sec- or tert-butoxytitanium trichloride, n-decoxytitanium trichloride, titanium tetrachloride and mixtures thereof.

Solid titanium compounds which may be used as still another component (C) of the catalyst composition of the present invention include those having alkoxy group in the proportion of not less than 0.2 to a titanium atom. The solid titanium compounds as defined above may be prepared by the reaction of alkylaluminum compound and tetravalent titanium compound.

Akylaluminum compounds which may be used in the preparation of the solid titanium compounds mentioned above preferably include, for example, trialkylaluminums such as, e.g., trimethylaluminum, triethylaluminum and tri-iso-butylaluminum; dialkylaluminum compounds such as, e.g., dimethylaluminum chloride, diethylaluminum chloride, di-iso-butylaluminum chloride, diethylaluminum ethoxide, diethylaluminum butoxide, di-iso-butylaluminum ethoxide and diethylaluminum hydride; and monoalkylaluminum halides such as, e.g., methylaluminum chloride, ethylaluminum dichloride and isobutylaluminum dichloride; and mixtures thereof.

Tetravalent titanium compounds used in the preparation of the solid titanium compounds constituting the catalyst component (C) referred to above are those having at least one alkoxy group per a titanium atom, including, for example, tetraalkoxytitaniums such as e.g., tetramethoxytitanium, tetraethoxytitanium, tetrapropoxytitanium, and tetra-n-, -iso-, -sec- or -tert-butoxytitanium; trialkoxytitanium chlorides such as, e.g., trimethoxytitanium chloride, triethoxytitanium chloride, tripropoxytitanium chloride, tri-n-, -iso-, -sec- or -tert-butoxytitanium chloride and tri-decoxytitanium chloride; dialkoxytitanium dichlorides such as, e.g., dimethoxytitanium dichloride, diethoxytitanium dichloride, dipropoxytitanium dichloride, di-n-, -iso-, -sec- or -tert-butoxytitanium dichloride and di-n-octoxytitanium dichloride; alkoxytitanium trichlorides such as, e.g., ethoxytitanium trichloride, n-, iso-, sec- or tert-butoxytitanium trichloride, and propoxytitanium trichloride; and mixtures thereof.

As described above, the solid titanium compounds used as the catalyst component (C) in the catalyst composition of the present invention may be prepared by mixing the above-mentioned alkylaluminum compound with the above-mentioned tetravalent titanium compound in the absence or presence of an organic solvent. The mixing is carried out at a temperature of preferably from $-20°$ C. to 200° C. with the mixture proportion of titanium to alkylaluminum compound of 1:0.1–100, and preferably 1:0.3–10, in a molar ratio.

When the alkylaluminum compound and the tetravalent titanium compound are mixed, there is produced a solid titanium compound which is insoluble in hydrocarbon solvents. The resulting solid titanium compound contains alkoxy group in the proportion of not less than 0.2 to a titanium atom, and it may be used as such or by separating it from unreacted reaction mixture or organic solvents.

Particularly preferable combination of the alkylaluminum compounds and the tetravalent titanium compounds in the preparation of the solid titanium compound used in the present invention includes dialkylaluminum chlorides and monoalkyltitanium trichlorides; and alkylaluminum dichloride and dialkoxytitanium dichlorides. The resulting reaction products may be successfully used as a catalyst component in the catalyst composition of the present invention.

The mixing proportions among the respective components (A), (B) and (C) referred to above are such that the weight ratio of the component (A) to component (B) is from 1:20 to 50:1, preferably from 1:10 to 10:1; and that of the component (A) to component (C) is from 1:50 to 100:1, preferably from 1:5 to 5:1.

There is imposed no restriction on the method of mixing the respective catalyst components nor on the order according to which the mixing is to be carried out. The mixing is preferably carried out at a temperature of from $-20°$ C. to 150° C. in the absence of air and in the presence of an inert solvent.

Preferable inert solvents are those containing substantially no impurities such as water having poisoning effect on this type of catalyst, including, for example, aliphatic, alicyclic and aromatic hydrocarbons such as, e.g. pentane, hexane, heptane, octane, cyclopentane, cyclohexane, methylcyclohexane, benzene, toluene, xylene, dichloroethane, chlorobenzene and mixtures thereof.

Since the material used for the preparation of the catalyst component (C) includes those may be used as the catalyst components (A) and (B) as such, the component (C) may be prepared in situ by mixing the components (A) and (B), instead of preparing the component (C) separately.

The polymerization process of the present invention may be carried out in accordance with the conventional procedures in the presence of the catalyst composition described above.

No particular restriction is imposed on the polymerization temperature and pressure. However, in general, it is preferable to operate the process at a temperature of from 0° C. to 200° C. and under a pressure of not higher than 100 atmospheres in the absence of air. The process can be practised either continuously or batch-wise.

In producing copolymers of ethylene, a mixture of ethylene and other α-olefin such as, e.g., propylene and butene-1 may be subjected to polymerization reaction in the presence of the catalyst composition of the present invention. In this instance, the amount of α-olefin used is not more than 5% by weight based on the weight of ethylene employed.

In the process of this invention, hydrogen may be used for controlling the molecular weight of the resulting polymer.

DESCRIPTION OF THE PREFERRED EMBODIMENTS

The following examples and comparative examples will serve to illustrate the present invention more fully. The present invention, however, should not be restricted by these examples.

In the following examples, the Q value referred to normally indicates the width of the molecular weight distribution and it means the ratio of the weight average molecular weight to number average molecular weight. The Q values shown in the following examples were measured by gel-permeation chromatograph according to the procedures described in Journal of Polymer Science, 2A, 835 (1964), by J. Moore.

COMPARATIVE EXAMPLES 1–3

To a 5-l.-capacity stainless steel autoclave so constructed as to withstand a pressure of 10 kg./cm.² were charged 2.5 l. of commercially available heptane together with organoaluminum compounds, tetravalent titanium compounds and trivalent titanium compounds of the types and amounts as specified in Table 1 shown below, and there was supplied ethylene with a pressure of 2 kg./cm.² (gauge) while heating at 80° C. with agitation. During the polymerization reaction, the heat of polymerization generated was removed by cooling with water and the temperature of the autoclave was maintained at 80° C.

After ethylene was introduced into the autoclave for 6 hours, the supply of ethylene was discontinued and the resulting polymer slurry was discharged from the autoclave which was then opened.

The results obtained were as tabulated in the following Table 1.

TABLE 1

| Comp. Example Nos. | Organoaluminum compound | | Tetravalent titanium compound | | Trivalent titanium compound | | Yield of ethylene polymer (g.) | Q value | Cohesion polymer |
|---|---|---|---|---|---|---|---|---|---|
| | Type | Amount used (g.) | Type | Amount used (g.) | Type | Amount used (g.) | | | |
| 1[1] | AlEtCl₂ | 2.5 | TiCl₄ | 0.62 | TiCl₃ | 1.25 | 360 | 15.2 | Yes. |
| 2[2] | AlEtCl₂ | 2.5 | Ti(OBu)₄ | 0.62 | TiCl₃ | 1.25 | 230 | 9.1 | Yes. |
| 3 | AlEt(OBu)Cl | 2.5 | Ti(OBu)₄ | 0.62 | TiCl₃ | 1.25 | 35 | 8.8 | No. |

[1] Similar to the process of Japanese Patent No. 284,311.
[2] Similar to the process of Japanese Patent No. 306,272.

EXAMPLE 1

(1) Preparation of solid titanium compound

To a 3-l.-capacity round-bottom flask were charged 520 ml. of commercially available heptane and 212 g. (0.8 mol) of di-n-butoxytitanium dichloride under nitrogen atmosphere. To a 2-l.-capacity charging funnel were taken 1080 ml. of commercially available heptane and 91 g. (0.8 mol) of triethylaluminum and the mixture was charged dropwise to aforementioned flask in the course of an hour under agitation while cooling at a temperature of from 0° C. to 5° C. Then, the reaction mixture was agitated at 40° C. for an hour. The resulting precipitate was filtered off, then, washed with 2 l. of commercially available heptane and heated at 70° C. followed by drying under a reduced pressure. There were yielded 150 g. of a darkbrownish dry powder.

According to the results of elementary analysis, it was found that the resulting powder contained 24.5 wt. percent titanium; 1.0 wt. percent aluminum; 35.2 wt. percent chlorine; 36.0 wt. percent butoxy group and 2.1 wt. percent ethyl group, and the resulting powder was a titanium compound substantially having a composition of Ti(OC₄H₉)Cl₂. It was also determined by an X-ray diffraction test that the resulting powder was non-crystalline.

(2) Polymerization of ethylene

To a 5-l.-capacity stainless steel autoclave so constructed as to withstand a pressure of 10 kg./cm.² were charged 2.5 l. of commercially available heptane, 2.50 g. of ethylbutoxyaluminum chloride, 0.62 g. of di-n-butoxytitanium dichloride and 1.25 g. of the solid titanium compound obtained in the preceding paragraph (1), and the resulting mixture was heated at 80° C. with the supply of ethylene thereto at a pressure of 2 kg./cm.² (gauge) under agitation.

During the polymerization reaction, the heat of polymerization generated was removed by cooling with water and the temperature of the autoclave was maintained at a temperature of 80° C.

After ethylene was introduced thereinto for 6 hours, the supply of ethylene was discontinued, and the resulting polymer slurry was discharged from the autoclave which was then opened.

No cohesion of polymer to the inside wall of the autoclave, agitator blades nor to sleeve of a thermometer provided in the autoclave was observed, except for some spotted traces slightly appreciable at the upper part of the inside wall.

A polymer was filtered off from the polymer slurry and dried under a reduced pressure at 65° C. for 3 hours. There was obtained 1060 g. of a white powder of polyethylene which was found to have a Q value of 6.1.

EXAMPLE 2

(1) Preparation of solid titanium compound

To a 500-ml.-capacity flask were charged 65 ml. of commercially available hexane and 26.5 g. (0.1 mol) of di-n-butoxytitanium dichloride under nitrogen atmosphere. Then, to a 200 ml. capacity charging funnel were taken 135 ml. of commercially available hexane and 12.1 g. (0.1 mol) of diethylaluminum chloride, and the mixture was charged dropwise to the afore-mentioned flask in the course of an hour under agitation while cooling at a temperature of from 20° C. to 30° C. Then, the reaction mixture was agitated at 40° C. for an hour. The resulting precipitate was filtered off then washed with 300 ml. of commercially available hexane and heated at 70° C. followed by drying under a reduced pressure. There were obtained 18 g. of a dark-brownish dry powder.

According to the results of elementary analysis, it was found that the resulting powder contained 23.7 wt. percent titanium; 0.7 wt. percent aluminum; 35.1 wt. percent chlorine; 37.0 wt. percent butoxy group and 2.0 wt. percent ethyl group, and the resulting powder was a titanium compound substantially having a composition of

$$Ti(OC_4H_9)Cl_2.$$

It was also determined by an X-ray diffraction test that the resulting powder was non-crystalline.

(2) Polymerization of ethylene

Ethylene was polymerized according to the same procedures as described in Example 1 under paragraph (2), except that the catalyst prepared in the preceding paragraph (1) was used and 2.5 l. of hexane was substituted for 2.5 l. of heptane.

Practically no cohesion of polymer to the inside wall of the autoclave, agitator blades nor to sleeve of a thermometer provided in the autoclave was observed.

A polymer was filtered off from the polymer slurry and dried under a reduced pressure at 65° C. for 3 hours. There were obtained 950 g. of a white powder of polyethylene which was found to have a Q value of 6.6.

EXAMPLE 3

(1) Preparation of solid titanium compound

To a 3-l.-capacity flask were charged 520 ml. of commercially available heptane and 212 g. (0.8 mol) of di-n-butoxytitanium dichloride under nitrogen atmosphere. To a 2-l.-capacity charging funnel were taken 1080 ml. of commercially available heptane and 203 g. (1.6 mol) of ethylaluminum dichloride and the mixture was charged dropwise to the aforementioned flask in the course of 20 minutes under agitation while maintaining the temperature at 40° C. Then, the reaction mixture was stirred at 80° C. for 3 hours.

The resulting precipitate was separated by decantation, then, washed with 2 l. of commercially available heptane and heated at 70° C. followed by drying under a reduced pressure. There were obtained 160 g. of a dark-brownish dry powder.

According to the results of elementary analysis, it was found that the resulting powder contained 22.8 wt. percent titanium; 1.9 wt. percent aluminum; 34.0 wt. percent chlorine; 38.1 wt. percent butoxy group and 2.5 wt. percent ethyl group, and the powder is a titanium compound substantially having a composition of $Ti(OC_4H_9)Cl_2$. It was also determined according to an X-ray diffraction test that the powder was non-crystalline.

(2) Polymerization of ethylene

Ethylene was polymerized according to the same procedures as described in Example 1 except that the catalyst prepared in the preceding paragraph (1) of the instant example was used and the supply of ethylene to the reaction system was reduced to 4 hours instead of 6 hours.

Practically no cohesion of polymer to an inside wall of the autoclave, agitator blades nor to sleeve of a thermometer provided in the autoclave was observed, except for spotted traces slightly noticeable at the upper portion of the inside wall.

A polymer was filtered off from the polymer slurry and dried under a reduced pressure at 65° C. for 3 hours to yield 1130 g. of a white powder of polyethylene. The polyethylene thus obtained had a Q value of 6.7.

EXAMPLES 4–14

Polymerization of ethylene was conducted by varying the types of alkylalkoxyaluminum chloride (component A) and $Ti(OR'')_nCl_{4-n}$ compound (Component B), polymerization temperature and polymerization time as shown in the following Table 2. The solid titanium compound as prepared in Example 3 under paragraph (1) was used as a catalyst component C.

The same equipment and operation procedures as described in Example 3 were employed in the instant example. The results obtained were as tabulated in Table 2.

tetrabutoxytitanium under nitrogen atmosphere. Then, to 2-l.-capacity charging funnel were taken 1080 ml. of commercially available heptane and 203 g. (1.6 mol) of ethylaluminum dichloride and the mixture was charged dropwise to the aforesaid flask in the course of 20 minutes under stirring while maintaining the temperature at 40° C. The reaction mixture was agitated at 80° C. for 5 hours.

The resulting precipitate was filtered off, then, washed with 2 l. of commercially available heptane and heated at 70° C. followed by drying under a reduced pressure to yield 152 g. of a brownish dry powder.

According to the results of elementary analysis, it was found that the powder contained 20.1 wt. percent titanium; 1.2 wt. percent aluminum; 15.0 wt. percent chlorine; 60.1 wt. percent butoxy group and 2.4 wt. percent ethyl group, and the powder was a titanium compound substantially having a composition of $$Ti(OC_4H_9)_2Cl$$

It was also determined by an X-ray diffraction test that the powder was non-crystalline.

(2) Polymerization of ethylene

Ethylene was polymerized according to the same procedures as described in Example 1 except that the catalyst prepared in the preceding paragraph (1) was employed; ethylethoxyaluminum chloride was used in place of ethylbutoxyaluminum chloride, and the polymerization temperature and the ethylene pressure employed were altered to 60° C. and 4 kg./cm.² (gauge), respectively.

Practically no cohesion of polymer to the inside wall of the autoclave, agitator blades nor to sleeve of a thermometer provided in the autoclave was observed.

A polymer was separated from the polymer slurry and dried at 65° C. for 3 hours. There were obtained 970 g. of a white powder of polyethylene which was found to have a Q value of 5.2.

COMPARATIVE EXAMPLE 4

Process using a binary catalyst composition lacking the component (B) of the catalyst composition of this invention Polymerization of ethylene was carried out according to the same procedures as described in Example 1 except

TABLE 2

| | Component A | | Component B | | Polymerization temp. (° C.) | Polymerization time (hrs.) | Yield of polyethylene (g.) | Conditions of cohesion of polymer | | | Q value |
|---|---|---|---|---|---|---|---|---|---|---|---|
| Ex. | Type | Amount used (g.) | Type | Amount used (g.) | | | | Inside wall of autoclave | Agitator blades | Thermometer sleeve | |
| 4 | Ethylbutoxyaluminum chloride. | 2.50 | Tetrabutoxytitanium. | 0.62 | 80 | 5 | 870 | Nil | Nil | Nil | 6.9 |
| 5 | ___do___ | 2.50 | Tributoxytitanium chloride. | 0.62 | 80 | 5 | 1,110 | Nil | Nil | Nil | 7.1 |
| 6 | ___do___ | 2.50 | Butoxytitanium trichloride. | 0.62 | 80 | 5 | 1,090 | (¹) | Nil | Nil | 10.2 |
| 7 | ___do___ | 2.50 | Titanium tetrachloride. | 0.62 | 80 | 5 | 720 | (¹) | Nil | (²) | 10.8 |
| 8 | ___do___ | 2.50 | Dibutoxytitanium dichloride. | 0.62 | 60 | 3 | 1,100 | Nil | Nil | Nil | 7.4 |
| 9 | ___do___ | 1.25 | ___do___ | 0.62 | 80 | 6 | 1,200 | Nil | Nil | Nil | |
| 10 | ___do___ | 2.50 | ___do___ | 0.31 | 80 | 6 | 1,030 | Nil | Nil | Nil | |
| 11 | ___do___ | 2.50 | Tetraethoxytitanium. | 0.62 | 80 | 6 | 690 | Nil | Nil | Nil | |
| 12 | ___do___ | 2.50 | Octoxytitanium trichloride. | 0.62 | 80 | 6 | 980 | (¹) | Nil | Nil | 7.4 |
| 13 | Butylbutoxyaluminum chloride. | 2.50 | Dibutoxytitanium dichloride. | 0.62 | 80 | 6 | 1,240 | Nil | Nil | Nil | |
| 14 | Ethylethoxyaluminum chloride. | 2.50 | ___do___ | 0.62 | 80 | 6 | 1,190 | Nil | Nil | Nil | |

¹ Spots at upper portion.
² Thin film <0.1 mm.

EXAMPLE 15

(1) Preparation of solid titanium compound

To a 3-l.-capacity flask were charged 520 ml. of commercially available heptane and 272 g. (0.8 mol) of that no di-n-butoxytitanium dichloride was used. Even after conducting the polymerization for 6 hours, there were yielded only 45 g. of polyethylene. The resulting polyethylene had a Q value of 6.5.

COMPARATIVE EXAMPLE 5

Process using a ternary catalyst composition in which other titanium compound than the catalyst component (C) of this invention was employed The polymerization reactions were carried out by using the same equipment and according to the same procedures as described in Example 3.

The results obtained were as tabulated in the following Table 3.

TABLE 3

| Ex. | Component (B) Type | Amount used (g.) | Polymerization temp. (°C.) | Polymerization time (hrs.) | Yield of polyethylene (g.) | Conditions cohesion of polymer Inside wall of autoclave | Agitator blades | Thermometer sleeve | Q value |
|---|---|---|---|---|---|---|---|---|---|
| 17 | Tributoxytitanium chloride | 0.62 | 90 | 5 | 1,100 | Nil | Nil | Nil | 7.0 |
| 18 | Dibutoxytitanium dichloride | 0.62 | 85 | 3 | 1,080 | Nil | Nil | Nil | 7.9 |
| 19 | Monobutoxytitanium trichloride | 0.31 | 80 | 5 | 1,020 | Nil | Nil | Nil | 9.8 |
| 20 | Titanium tetrachloride | 0.20 | 85 | 6 | 1,050 | Nil | Nil | Nil | 10.1 |

Polymerization of ethylene was conducted using the same equipment and according to the procedures as described in Example 1, except that titanium trichloride which was obtained by treating titanium tetrachloride with a metallic aluminum and activating the resulting product was used in place of the solid titanium compound referred to therein.

There were yielded only 18 g. of polyethylene, in spite of the fact that the polymerization reaction was carried out for 6 hours. The resulting polyethylene had a Q value of 10.3.

EXAMPLE 16

Example 15 was repeated by using the same equipment and according to the same procedures as described therein, except that a gaseous mixture of ethylene and 2.0 wt. percent of propylene was introduced to the autoclave.

No adhesion of polymer to the inner surface of the autoclave was observed.

There were obtained 930 g. of a white powder polymer. According to the infrared absorption spectra examination, it was confirmed that the resulting polymer was an ethylene/propylene copolymer containing 1.5% by weight of propylene. The Q value of the copolymer was 5.1.

EXAMPLES 17–20

(1) Preparation of solid titanium compound

To a 500-ml. flask were charged 170 ml. of commercially available heptane and 54.5 g. (0.24 mol) of monobutoxytitanium chloride under nitrogen atmosphere. Then, to a 100-ml.-capacity charging funnel were taken 40 ml. of commercially available heptane and 28.8 g. (0.24 mol) of diethylaluminum chloride and the mixture was charged dropwise to the aforesaid flask in the course of 4 hours under agitation while maintaining the temperature at 60–65° C.

The resulting precipitate was filtered off, then, washed with 300 ml. of commercially available heptane and heated at 70° C. followed by drying under a reduced pressure. There were obtained 42 g. of a dark-brownish dry powder.

According to the results of elementary analysis, it was found that the resulting powder contained 28.1 wt. percent titanium; 1.0 wt. percent aluminum; 56.9 wt. percent chlorine; 12.8 wt. percent butoxy group and 1.2 wt. percent ethyl group and the powder was a titanium compound substantially having a composition of $Ti(OC_4H_9)_{0.3}Cl_{2.7}$.

(2) Polymerization of ethylene

Ethylene was polymerized by using 1.25 g. of the solid titanium compound prepared in the preceding paragraph (1) and varying the type of $Ti(OR'')_nCl_{4-n}$ compound (component B) as shown in the following Table 3.

We claim:

1. Process for producing polymers of ethylene which comprises bringing a member selected from the group consisting of ethylene and a mixture of ethylene and not more than 5% by weight of α-olefin based on the weight of ethylene into contact with a catalyst composition essentially consisting of (A) alkylalkoxyaluminum chloride represented by the general formula, AlR(OR')Cl, wherein R represents an alkyl group having from 1 to 8 carbon atoms and OR' represents an alkoxy group having from 1 to 10 carbon atoms, (B) tetravalent titanium compound represented by the general formula, $Ti(OR'')_nCl_{4-n}$, wherein OR'' represents an alkoxy group having from 1 to 10 carbon atoms and $n$ is an integer of from 0 to 4; and (C) solid titanium compound containing alkoxy group having from 1 to 10 carbon atoms in the proportion of not less than 0.2 to a titanium atom, separated from a reaction product of titanium compound represented by the general formula, $Ti(OR'')_nCl_{4-n}$ wherein OR'' represents an alkoxy group having from 1 to 10 carbon atoms and $n$ is an integer of from 1 to 4, with alkyl aluminum compound, the proportion of said (A) component to said (B) component being from 1:20 to 50:1 in a weight ratio, and the proportion of said (A) component to said (C) component being from 1:50 to 100:1 in weight ratio, the mixing proportion of titanium to alkylaluminum compound used to prepare catalyst component (C) being 1:0.1–100 in a molar ratio.

2. Process according to claim 1 wherein said (C) component is a reaction product of dialkylaluminum chloride and monoalkoxytitanium trichloride.

3. Process according to claim 1 wherein said (C) component is a reaction product of alkylaluminum dichloride and dialkoxytitanium dichloride.

References Cited

UNITED STATES PATENTS 2,905,661  9/1959  Muehlbauer et al. ____ 260—93.7

FOREIGN PATENTS 828,201  2/1960  Great Britain.
873,226  7/1961  Great Britain.
944,371  12/1963  Great Britain.
1,127,096  9/1968  Great Britain.

JOSEPH L. SCHOFER, Primary Examiner

E. J. SMITH, Assistant Examiner

U.S. Cl. X.R.

252—429 C; 260—94.9E